Patented May 18, 1943

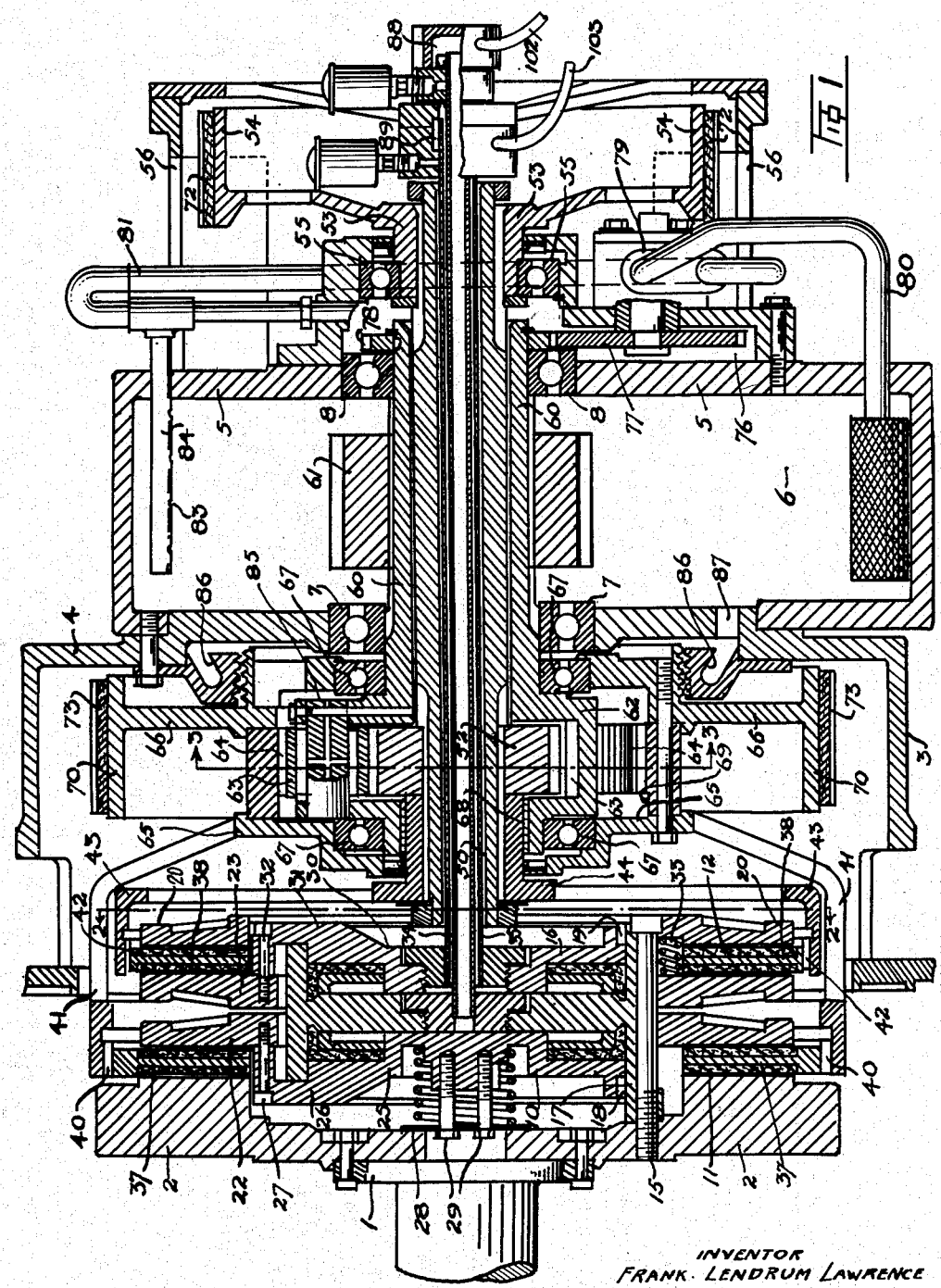

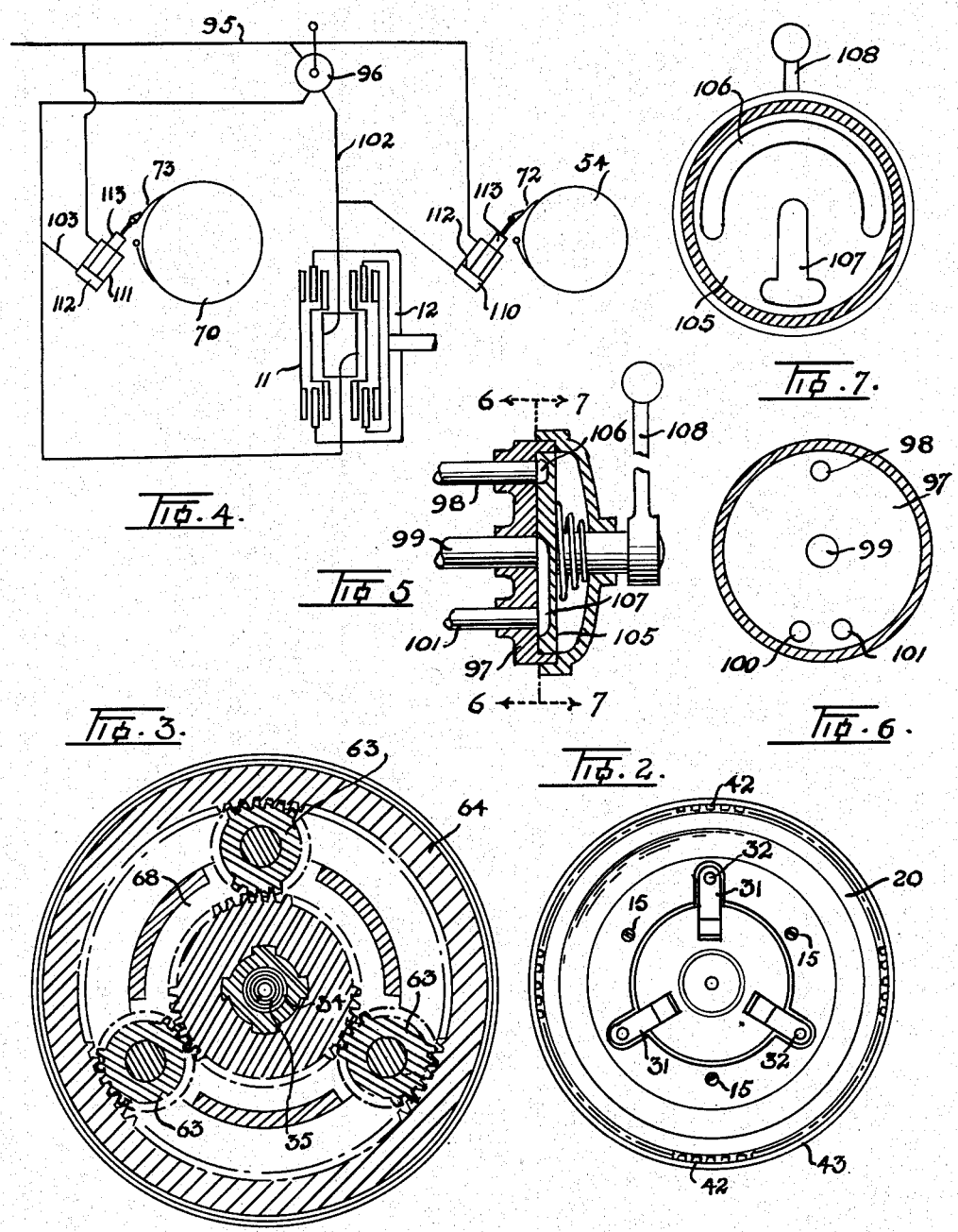

2,319,549

UNITED STATES PATENT OFFICE 2,319,549

TRANSMISSION

Frank Lendrum Lawrence, Renton, Wash.

Application May 19, 1941, Serial No. 394,154

5 Claims. (Cl. 74—270)

My invention relates to improvements in planetary change speed transmissions and lubricating systems therefor.

The objects of the invention are to provide a structure in which the parts are so arranged as to facilitate assembly and to provide means whereby the lubricating oil will flow between coaxial parts of the mechanism and through passages defined by anti-friction bearings, so that said bearings shall be kept clear of extraneous accumulation of any kind.

The invention consists of a planetary transmission, a shaft surrounded in part by a main drive sleeve and being fitted with a power take off gear, and a planetary train connecting the shaft to the main sleeve, which planetary train is enclosed in a rotatable housing, as will be more fully described in the following specification and shown in the accompanying drawings, in which—

Fig. 1 is a longitudinal sectional view of the invention showing the clutches and the change speed transmission to which it is attached.

Fig. 2 is a reduced scale view of the outer clutch flange taken on the line 2—2 of Figure 1.

Fig. 3 is a sectional view of the planetary train taken on the line 3—3 of Figure 1.

Fig. 4 is a diagrammatic view showing the clutch and brake control.

Fig. 5 is a transverse sectional view of the preferred type of control valve.

Figs. 6 and 7 are face views of the valve parts taken on the lines 6—6 and 7—7 of Figure 5.

In the drawings like characters of reference indicate corresponding parts in each figure.

The numeral 1 indicates the crank shaft flange of a motor to which is fitted a flywheel 2. The motor is provided with the usual crank shaft housing, not shown, and to said housing a clutch and transmission housing 3 is secured. The housing 3 is made in sections to facilitate assembly and is provided with transverse walls 4 and 5 between which an oil sump 6 is defined. The walls 4 and 5 support main bearings 7 and 8 respectively in which the entire transmission and the clutch driving members are rotatably carried, so that by simply removing the fastenings between the housing 3 the transmission can be removed from the motor flywheel and the clutch parts mounted thereon.

Secured to the face of the flywheel is a multiple clutch 10 consisting of two separate clutches 11 and 12 capable of selective operation. Rotatable with the flywheel and secured thereto by bolts 15, one only of which is shown, is a cylinder head 16 walled as at 17 on its periphery to provide cylinders 18 and 19 and having at the outer extremity an annular clutch flange 20. The walls of the cylinders are splined and are fitted with annular pressure plates 22 and 23. The cylinder 18 is fitted with a piston 25 having peripheral lugs 26, one only shown in Figure 1, to which the pressure plate 22 is connected by bolts 27. This piston is provided with a spring pressed thrust plate 28 to return the piston to normal position of rest, this thrust plate abuts the flywheel 2 and is held in position by bolts 29 so that on removal of the clutch assembly the thrust plate and its part will remain as a united attached to the piston 25.

The cylinder 19 is provided with a piston 30 which is provided with lugs 31, one only shown in Figure 1, to which the pressure plate 23 is secured by bolts 32. Springs 33, one only shown, serve to return the piston 30 to normal position.

Communicating with the cylinder 18 is an axially mounted tube 34 through which operating fluid is adapted to be forced from a suitable source of supply. Concentrically mounted around the tube 34 is a tube 35 which communicates with the cylinder 19, leading from the same source of supply to actuate the piston 30.

Clutch plates 37 and 38 each splined on their outer periphery are fitted between the flywheel 2 and pressure plate 22 and between the pressure plate 23 and the clutch flange 20 respectively. The clutch plate 37 is connected by splines 40 to a bell 41 and the clutch plate 38 is connected by splines 42 to a bell 43, which bell is concentric within the bell 41. The bell 43 is provided with a hub 44 which is splined upon a hollow shaft 50 which is concentric with the operating fluid pipes 34 and 35. The shaft 50 is fitted with a sun gear 52. The rear end of the shaft 50 is fitted with the hub 53 of a brake drum 54, and the hub is journalled in a bearing 55 carried by an open brake housing 56 from the wall 5 of the housing 3.

Journalled in the main bearings 7 and 8 is a main sleeve 60 which is fitted intermediate its length with a power take off pinion or sprocket 61 and has formed at its inner end a cage 62 in which planet gears 63 in mesh with the sun gear 52 are rotatably carried. The planet gears 63 mesh with a ring gear 64 which is carried on annular members 65 and 66. The member 65 forms part of the bell 41 and both members are journalled on bearings 67 which are carried on the hubs of the cage 62. At the left hand end, see Figure 1, of the cage is a bushing 68 which journals the hub of the bell 43. The ring gear 64 and the members 65 and 66 form a rotating housing 69. Supported from the member 66 is a brake drum 70 which obviously rotates in unison with the bell 41.

The brake drums 54 and 70 are provided with brake bands respectively indicated by the numerals 72 and 73, mounted to be self-energizing and which are actuated by suitable fluid means to be hereinafter described.

Mounted in a subsidiary housing 76 is a gear 77 driven from a pinion 78 upon the main sleeve 60 and mounted outside the housing 76 is an oil pump 79 driven from the gear 77. The pump 79 derives its supply from a suction pipe 80 communicating with the housing 6 and delivers its oil through a pipe 81 to the interspace between the hollow shaft 50 and the main sleeve 60 and through outlets 83 in a branch pipe 84 into the housing 6 and onto the main sleeve 60 and its associated parts. The oil passing between the shaft 50 and the main sleeve 60 discharges into the cage 62 where it lubricates the planetary train and through a duct 85 to the planet gears 63 and the rotatable housing 69, finally passing out through the openings in wall of 66 into a collector ring 86 and through an opening 87 leading into the housing 6. Oil will fill the subsidiary housing 76.

The outer end of the tubes 34 and 35 leads into suitably glanded chambers indicated by the numerals 88 and 89 which are in communication with suitable sources of supply of fluid pressure to actuate the clutches 11 and 12.

Fluid pressure for actuating the brakes and clutches is derived from a suitable source of supply through a pipe 95 (Figure 4) which connects with a manual control valve 96. The control valve 96 consists of a body 97, see Figures 5 and 6, having an inlet port 98 connecting with the pipe 95, a central exhaust port 99 and transfer ports 100 and 101 to which are connected pipes 102 and 103. Fitted within the body 97 is a rockably mounted disc 105 having an arcuate ported passage 106 capable of simultaneous registry with the inlet port 98 and one or both of the transfer ports 100 and 101 and a T-shaped ported passage 107 which communicates with either or both the transfer ports and the exhaust port 99. This disc is fitted with a lever 108 by which it may be rocked.

The brake bands 72 and 73 are actuated by cylinders 110 and 111 respectively which are shown diagrammatically in Figure 4, each cylinder includes a piston 112 and piston rod 13, which latter is connected to the brake band. Pressure is constantly applied to the front of each cylinder 110 and 111 from the supply pipe 95 to apply the brakes when the rear end of the cylinders is open to exhaust, through the pipes 102 and 103, the transfer ports 100 and 101 and the exhaust port 99 of the control valve 96. The pipes 102 and 103 connect not only with the brake bands but with the cylinders of the clutches 11 and 12, so that when the valve 96 is set as shown in Figure 4 both clutches are inactive and their pistons, 25 of clutch 11 and 30 of clutch 12, are returned to normal position by the springs of the thrust plate 29 and the springs 33 respectively. When the handle 108 of the control valve is moved to right or left to cause the arcuate passage 106 to register with the inlet port 98 and both transfer ports, pressure will be exerted to both clutches 11 and 12 to actuate them and cause both bells 41 and 43 to rotate and also to thrust the pistons of both brake cylinders 110 and 111 forward against the counter pressure from the supply line 95 to take off the brakes. It will be obvious that the effective piston area is less on the piston rod side than on the rear side adjacent the cylinder head, therefore, in spite of the pressure per unit of area being equal, the effort upon the rear side of each piston will be greater than on the piston rod side and the brake bands will be slackened. When the lever is moved over until the arcuate passage 106 covers one only of the transfer ports, say for instance port 100, then the pressure will be exerted only to operate clutch 12 and release the brake band 72, while clutch 11 will remain inactive and the constant pressure from pipe 95 will keep the band 73 engaged to its drum 70.

The operation of the transmission is as follows:

When the hollow shaft 50 is rotated through the engagement of the clutch 12 and the ring gear 64 is held at rest, the planet gears 63 are rotated and caused to travel around the ring gear, thus imparting rotation through the cage 62 and the main sleeve 60 and the take off pinion 61. When the clutch 11 is engaged and the clutch 12 disengaged the sun gear is held at rest through the brake drum being engaged by the brake band 72 and the ring gear rotated about it, consequently the planet gears 63 will travel around the sun gear and rotate the take off pinion 61 at intermediate speed. When both clutches 11 and 12 are engaged both brakes are released, the planetary train, the hollow shaft 50 and the main sleeve 60 will rotate as a unit, giving engine speed to the take off pinion 61.

What I claim as my invention is:

1. A planetary transmission having a shaft and a main drive sleeve surrounding said shaft and spaced therefrom to define an annular oil passage, a housing rotatable with the sleeve, a planetary train within the rotatable housing, said planetary train connecting the shaft and the main drive sleeve, a stationary housing surrounding a portion of the shaft and the sleeve, said housing having a wall adjacent one end of the rotatable housing, said wall having an oil opening and an oil collector ring surrounding the shaft and the opening, said rotatable housing having one end projecting into said oil collector ring adjacent the stationary wall and being provided with a passage for the flow of oil from the rotary housing into the oil collector ring, said oil being adapted to flow through the opening in the wall of said stationary housing.

2. A planetary transmission having a shaft and a main drive sleeve surrounding said shaft and spaced therefrom to define an annular oil passage, a housing rotatable with the sleeve, a planetary train within the rotatable housing, said planetary train connecting the shaft and the main drive sleeve, a stationary housing surrounding a portion of the shaft and the sleeve, a gear driven oil pump, a subsidiary housing for the oil pump gears, said housing being in communication with the annular oil passage between the shaft and the main sleeve and with the stationary housing, said pump being adapted to deliver oil from the stationary housing to the annular oil passage through the rotating housing and back to the stationary housing and to supply oil to the subsidiary housing and from said subsidiary housing back to the stationary housing.

3. In a planetary transmission including a sun gear, a planet gear and cage, and a rotating housing including a ring gear in mesh with the planet gear, a brake drum rotatable with the rotating housing, a brake drum rotatable with the sun gear shaft, a band brake for each brake drum, means for normally holding both bands in braking engagement with their drums by constant fluid under pressure applied over a given operative area and for selectively disengaging any of said bands from their drums by applying fluid under identical pressure over a greater area counter to the force effecting the braking engagement.

4. In a planetary transmission including a sun gear, planet gears and cage, and a rotating housing including a ring gear in mesh with the planet gears, a brake drum rotatable with the rotating housing, a brake drum rotatable with the sun gear shaft, a band brake for each brake drum, means for normally holding both bands in braking engagement with their drums by constant fluid under pressure and for disengaging said bands from their drums selectively while maintaining said pressure.

5. In a planetary transmission including a sun gear, planet gears and cage, and a rotating housing including a ring gear in mesh with the planet gears, a brake drum rotatable with the rotating housing, a brake drum rotatable with the sun gear shaft, a band brake for each brake drum, a double acting cylinder having a piston operatively connected with each brake band, each of said pistons having a large pressure area on one side and a small pressure area on the other side, said cylinders being adapted for connection to a source of fluid under pressure to apply pressure constantly to the small pressure area side of each piston and to be selectively applied to large pressure areas of said pistons and a valve for controlling the flow of fluid to the large piston areas of each cylinder.

FRANK LENDRUM LAWRENCE.